United States Patent
Francis et al.

(10) Patent No.: US 6,665,861 B1
(45) Date of Patent: Dec. 16, 2003

(54) APPARATUS AND METHOD FOR PROVIDING METADATA FOR THE CREATION OF SEMI-DEPLOYED ENTERPRISE JAVA BEANS

(75) Inventors: Timothy Marc Francis, Keswick (CA); Lawrence Scott Rich, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 09/645,740

(22) Filed: Aug. 24, 2000

(51) Int. Cl.[7] ............................................. G06F 9/44
(52) U.S. Cl. ........................................... 717/120
(58) Field of Search ................... 717/106–107, 717/118, 120–121, 166, 174–178; 709/245–246; 707/102, 103 R, 103 Y (56) References Cited

U.S. PATENT DOCUMENTS

| | | | | |
|---|---|---|---|---|
| 5,937,409 A | * | 8/1999 | Wetherbee | 707/103 R |
| 5,991,534 A | | 11/1999 | Hamilton et al. | 395/701 |
| 6,023,271 A | | 2/2000 | Quaeler-Bock et al. | 345/335 |
| 6,026,405 A | | 2/2000 | Arda et al. | 707/10 |
| 6,167,453 A | * | 12/2000 | Becker et al. | 709/245 |
| 6,237,135 B1 | * | 5/2001 | Timbol | 717/107 |
| 6,269,373 B1 | * | 7/2001 | Apte et al. | 707/10 |
| 6,502,112 B1 | * | 12/2002 | Baisley | 715/513 |

* cited by examiner

Primary Examiner—Todd Ingberg
Assistant Examiner—Lawrence J Shrader
(74) Attorney, Agent, or Firm—A. Bruce Clay; Carstens, Yee & Cahoon (57) ABSTRACT

An apparatus, method, and system for generating semi-deployed enterprise java beans is provided. The apparatus, method and system make use of metadata to identify an intended deployment of an undeployed enterprise java bean. The metadata may be packaged with the undeployed enterprise java bean into a java archive file which is provided to a deployment tool either on the same computing device or a different computing device. The deployment tool may make use of the metadata when generating deployment classes for the undeployed enterprise java bean. However, if the deployment tool is unable to recognize the metadata or the use of the metadata is not wanted, the deployment tool may also deploy the undeployed enterprise java bean in a conventional manner.

22 Claims, 9 Drawing Sheets

```xml
<?xml version="1.0" encoding="UTF-8"?>
<xmi:XMI>
    <Content>
        <mof:Package mofPackageName="com.ibm.sample">
            <ownedElements>
                <java:JavaClass xmi:id="Ejb2Bean" name="Ejb2Bean">
                    <ownedElements>
                        <java:Field xmi:id="Ejb2_finteger" name="finteger" type="beaninfo://#int>
                        <java:Field xmi:id="Ejb2_fstring" name="fstring" type= "beaninfo://java.1>
                    </owned Elements>
                </java:JavaClass>
            </owned Elements>
        </mof:Package>
    </Content>
</xmi:XMI>
```

FIG. 7

```xml
<?xml version="1.0" encoding="UTF-8"?>
<xmi:XMI>
    <Content>
        <RDBSchema:Schema xmi:id="Scenario2_Schema" name="Scenario2">
            <tables>
                <RDBSchema:Table xmi:id="Ejb2" name="Ejb2">
                    <columns>
                        <RDBSchema:Column xmi:id="Ejb2_finteger" name-"finteger" allowNull="false">
                        <RDBSchema:Column xmi:id="Ejb2_fstring" name="fstring" allowNull="true">
                            <localType>
                                <RDBSchema:SQLCharacterStringType xmi:id="dbVarchar30_6400355056">
                            </localType>
                            <type>
                                <RDBSchema:SQLCharacterStringType xmi:id="dbVarchar30_6400355056">
                            </type>
                        </RDBSchema:Column>
                    </columns>
                </RDBSchema:Table>
            </tables>
        </RDBSchema:Schema>
    </Content>
</xmi:XMI>
```

FIG. 8

```xml
<?xml version="1.0" encoding="UTF-8"?>
<xmi:XMI>
    <Content>
        <rdbMap:RDBClassMapper outputs="smlns://model#Ejb2">
            <iscomposedby>
                <rdbMap:RDBTableMapper>
                    <iscomposedby>
                        <rdbMap:RDBAttributeMapper outputs="xmlns://beans#Ejb2_finteger" inputs="Ejb2_finteger"
                        <rdbMap:RDBAttributeMapper outputs=xmlns://beans#Ejb2_fstring" inputs="Ejb2_fstring">
                    </iscomposedby>
                </rdbMap:RDBTableMapper>
            </iscomposedby>
        </rdbMap:RDBClassMapper>
    </Content>
</xmi:XMI>
```

APPARATUS AND METHOD FOR PROVIDING METADATA FOR THE CREATION OF SEMI-DEPLOYED ENTERPRISE JAVA BEANS

BACKGROUND OF THE INVENTION

1. Technical Field

The present invention is directed to an apparatus and method for providing metadata for the creation of semi-deployed enterprise Java beans. In particular, the present invention is directed to an apparatus and method for including, in a Java Archive (JAR) file, such metadata as to provide an enterprise Java bean with deployment information to aid in deployment of the undeployed enterprise Java bean.

2. Description of Related Art

Enterprise Java beans (EJBs) are components in the Java programming language (Java is a trademark of Sun Microsystems, Inc.) used when building a distributed transaction-oriented enterprise application. EJB systems allow developers to focus on the actual business architecture of a business model, rather than worry about endless amounts of programing and coding needed to connect all the working parts. This task is left to EJB server vendors. Developers just design (or purchase) the needed EJB components and arrange them on the server. Because ETB systems are written in Java, they are platform independent. Being object oriented, they can be implemented into existed systems with little or no recompiling and configuring.

The EJB standard defines a number of roles and scenarios that are used to define the content and capability of the EJB through various stages in its development. An EJB is initially created with business logic but no knowledge of how its persistence will be managed. Such a bean is known as an "undeployed" EJB. The mapping between the persistent fields of an "undeployed" EJB and a persistent storage, such as a database, is completed at a separate time. This mapping requires additional code to be generated. The resulting Java code created based on the undeployed EJB and the additional code generated to map to a specific persistent storage and run in a specific container is known as a "deployed" EJB.

The separation of these stages is intentional and has two key benefits. First, it allows domain specific experts to concentrate their roles. Thus, the bean provider is an application domain expert who does not need to program transactions, concurrency or other runtime infrastructure into the EJB. Likewise, the deployer is an expert in a specific operational environment who must generate the additional classes to manage the EJB at runtime.

Second, it provides for portability of the undeployed bean onto any compliant server. It is possible to purchase undeployed EJBs from other companies and then deploy them into the application server of choice. The undeployed EJB will have no knowledge of the server in which it will eventually run.

The problem with this separation is that it provides no intermediate position. In other words, if an EJB creator does have information such as how an EJB's persistent fields should be mapped to a data storage, there is no mechanism to indicate this in the EJB short of creating a deployed bean. However, a deployed bean is specific to one server, which prevents the bean from being portable across servers.

Thus, it would be beneficial to have an apparatus and method for creating semi-deployed enterprise Java beans incorporating the business logic and some additional information that may be used to aid the deployment or execution of the enterprise Java bean, while the undeployed enterprise Java bean still remains portable to other server environments.

SUMMARY OF THE INVENTION

The present invention provides an apparatus, method, and system for generating semi-deployed enterprise java beans. The apparatus, method and system make use of metadata to identify an intended deployment of an undeployed enterprise java bean. The metadata may be packaged with the undeployed enterprise java bean into a java archive file which is provided to a deployment tool either on the same computing device or a different computing device. The deployment tool may make use of the metadata when generating deployment classes for the undeployed enterprise java bean. However, if the deployment tool is unable to recognize the metadata or the use of the metadata is not wanted, the deployment tool may also deploy the undeployed enterprise java bean in a conventional manner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
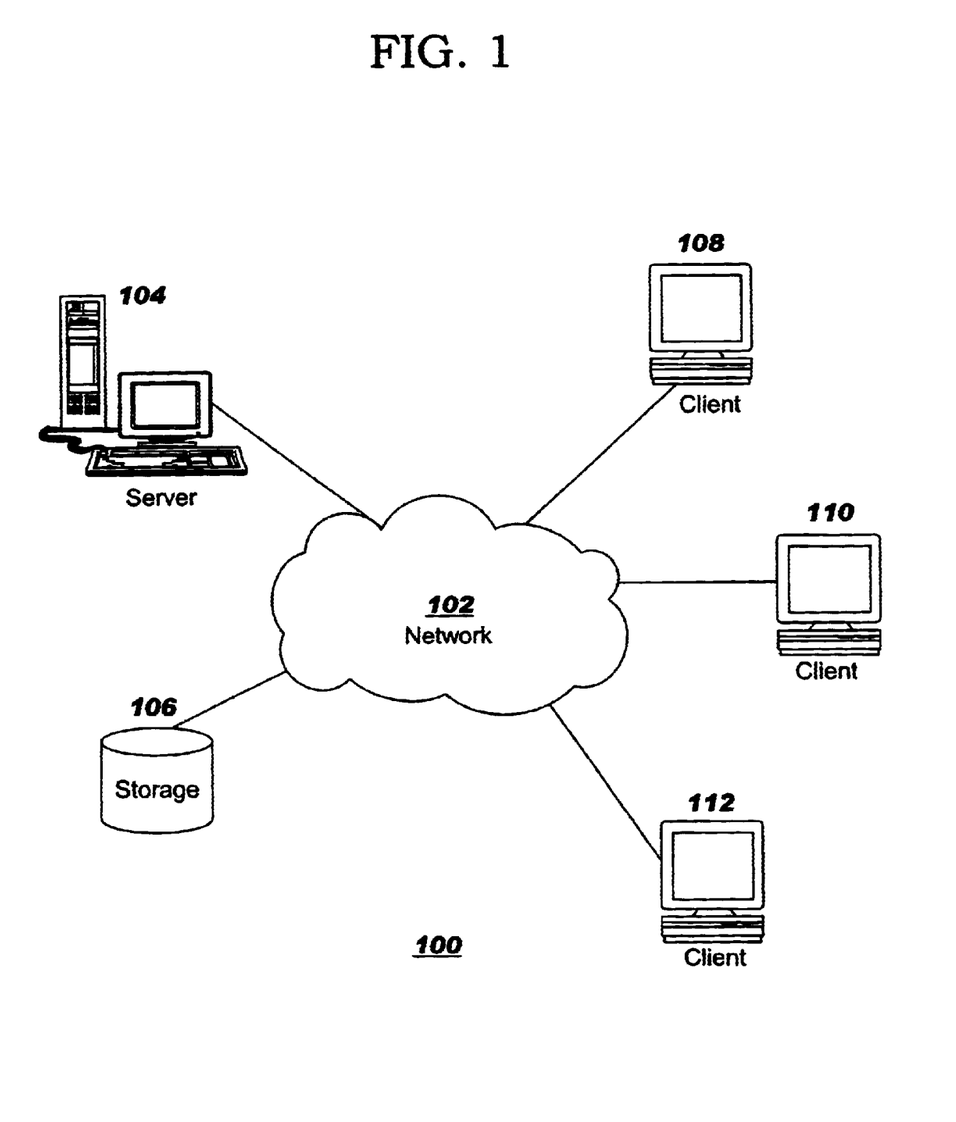
FIG. 1 is a diagram illustrating a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
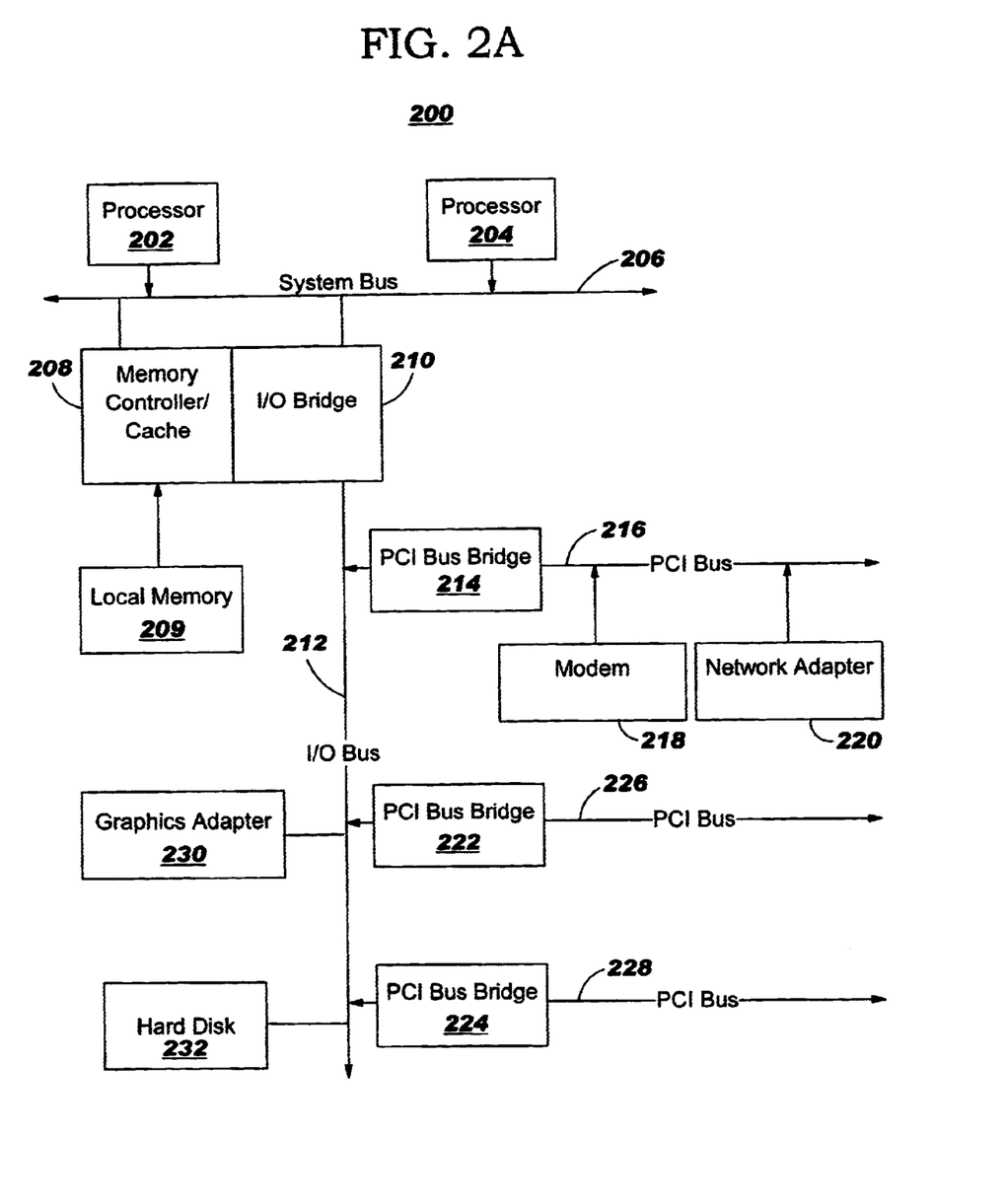
FIG. 2A is an exemplary block diagram of a server according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, New York, running the Advanced Interactive Executive (AIX) operating system.

Figure 2B:
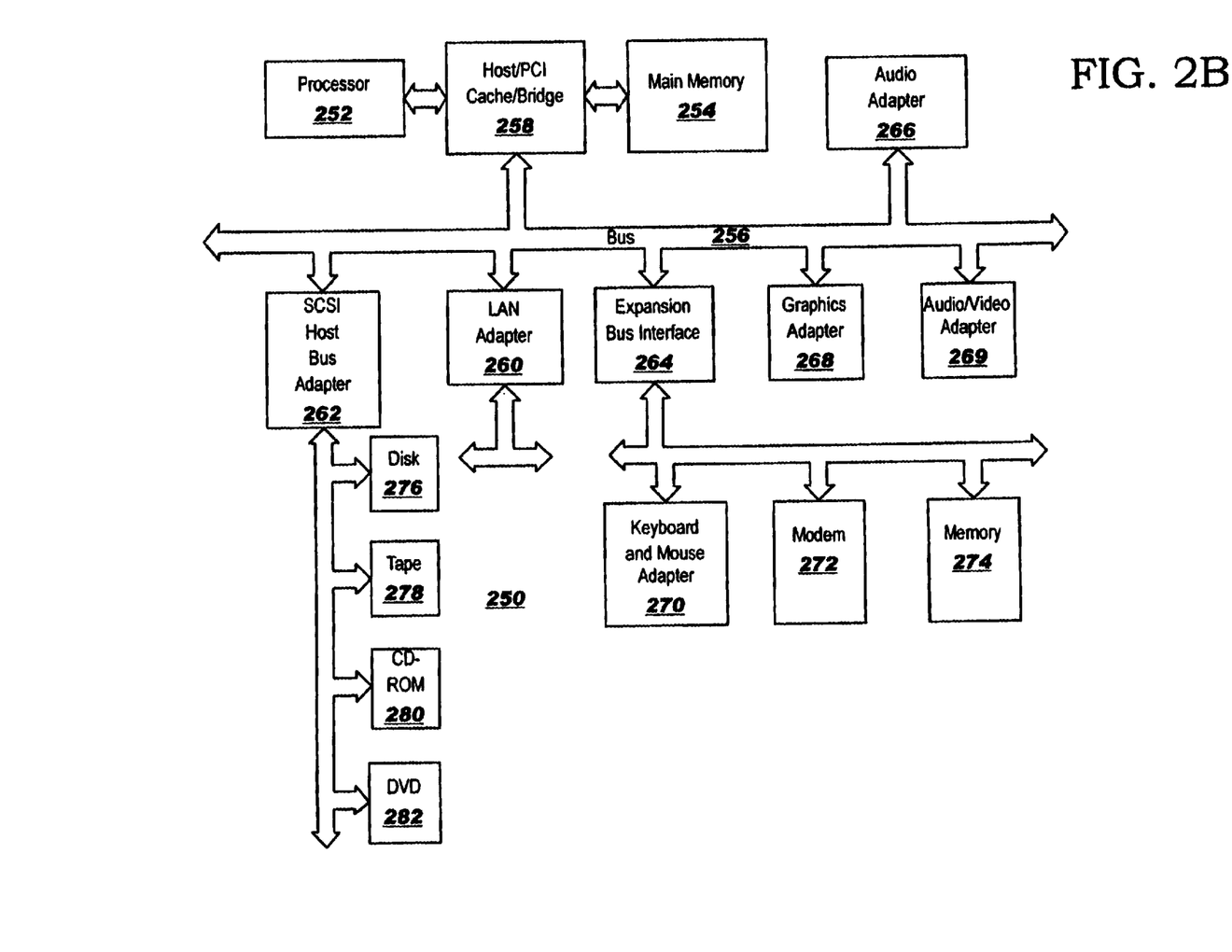
FIG. 2B is an exemplary block diagram of a client device in accordance with the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business or OS/2, which are available from International Business Machines Corporation. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for providing a semi-deployed enterprise Java bean (EJB). In order to provide a framework for understanding the present invention, a brief description of enterprise Java beans will be provided. This brief description includes excerpts from the article "A Beginner's Guide to Enterprise JavaBeans," by Mark Johnson, JavaWorld World, October 1998, available at Www.javaworld.com/javaworld/jw-10-1998/f_jw-10-beans.html which is hereby incorporated by reference.

The basic idea of enterprise Java beans is to provide a framework for components that may be "plugged in" to a server, thereby extending that server's functionality. The EJB technology is governed by the Enterprise JavaBeans Specification, available from http://java.sun.com/products/ejb/docs.html.

EJB is designed to make it easy for developers to create applications, freeing them from low-level system details of managing transactions, threads, load balancing, and so on. Application developers can concentrate on business logic and leave the details of managing the data processing to the framework.

The basic elements of an EJB client/server system include the EJB component, the EJB container and the EJB object. An enterprise Java bean is a component. Enterprise Java beans execute within an EJB container, which in turns executes within an EJB server. Any server, such as server 200, that can host an EJB container and provide it with the necessary services can be an EJB server.

An EJB component is a Java class, written by an EJB developer, that implements business logic. All other classes in the EJB system either support client access to or provide services, such as persistence, and so on, to EJB component classes.

The EJB container provides services such as transaction and resource management, versioning, scalability, mobility, persistence, and security to the EJB components it contains. Since the EJB container handles all of these functions, the EJB component developer can can concentrate on business rules and leave database manipulation and other such fine details to the EJB container. For example, if a single EJB component decides that the current transaction should be aborted, it simply tells its EJB container and the container is responsible for performing all rollbacks, or doing whatever is necessary to cancel a transaction in progress. Multiple EJB component instances typically exist inside a single EJB container.

Client programs execute methods on remote EJBs by way of an EJB object. The EJB object implements the remote interface of the EJB component on the server. The remote interface represents the business methods of the EJB component and does all of the actual useful work of an EJB object, such as creating an order form or deferring a patient to a specialist.

EJB objects and EJB components are separate classes which implement the same interface, the EJB component's remote interface. However, the EJB object runs on the server in an EJB container and implements business logic while the EJB object runs on the client and remotely executes the EJB component's methods.

The actual implementation of an EJB object is created by a code generation tool that comes with the EJB container. The EJB object's interface is the EJB component's remote interface. The EJB object and the EJB component implement the same remote interface.

Figure 3:
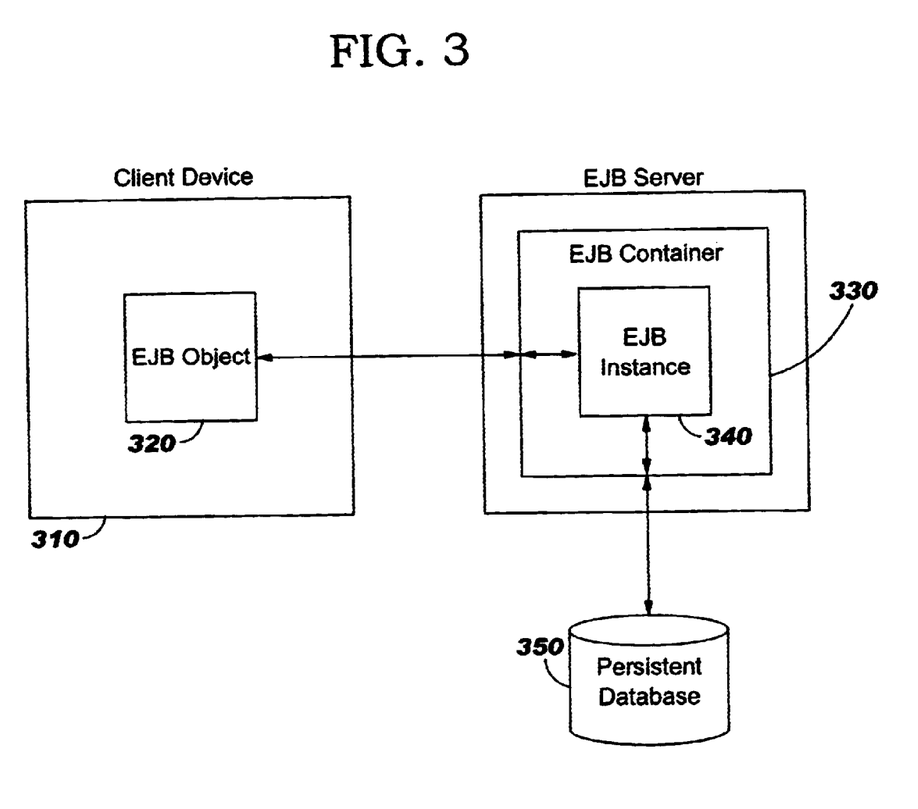
FIG. 3 is an exemplary diagram illustrating the prior art EJB client/server system.

FIG. 3 is an exemplary diagram illustrating the prior art EJB client/server system. As shown in FIG. 3, when the client device 310 calls a method on an EJB object 320, the EJB object 320 method communicates with the remote EJB container 330 requesting that the same method be called on the EJB component instance 340 with the same arguments, on the client device's behalf. The EJB component instance 340 communicates with the EJB container 330 based on the called method and the EJB container 330 performs the necessary functions for persistence of data in an associated database 350.

Thus, as described above, the traditional client/server EJB system requires that an EJB designer create an EJB component, i.e. an undeployed EJB, while another specialist creates the additional classes necessary to execute the EJB in a specific container, in order to generate a deployed EJB. The present invention provides a mechanism by which the EJB component designer can provide additional metadata information that can be used when the EJB component, i.e. the undeployed EJB, is "deployed." and then executed. In other words, the EJB designer is given a mechanism, by the present invention, through which he/she can provide some instruction as to how the EJB should be deployed and execute in a container The resulting EJB is termed a semi-deployed EJB.

The present invention allows an EJB designer to specify the undeployed EJB in the manner generally known in the art. In addition, the EJB designer may specify, in metadata, various deployment information for guiding the generation of the deployment classes of the EJB container. The undeployed EJB and the metadata are stored in an undeployed Java Archive (JAR) file. At deployment, the EJB tool of a server to which the semi-deployed EJB is to be deployed may read the undeployed EJB information and the metadata information and create deployment classes based on the undeployed EJB information and the metadata information.

While the metadata included in the semi-deployed EJB may be any type of metadata that provides guidance to an EJB container creation tool on a server, the exemplary embodiments of the present invention will be described in terms of a mapping to a persistent storage. These embodiments are chosen only for illustrative purposes and are not meant to limit the invention to mapping to persistent storage.

Another example is the inclusion of EJB design information that may be used at execution time to supplement debugging, trace and logging tools. Thus, the metadata of the present invention, while principally used at deployment time, may also be utilized at execution time without departing from the spirit and scope of the present invention. The metadata may be used, for example, by a Java virtual machine to interpret the EJB and properly implement the methods therein.

Figure 4:
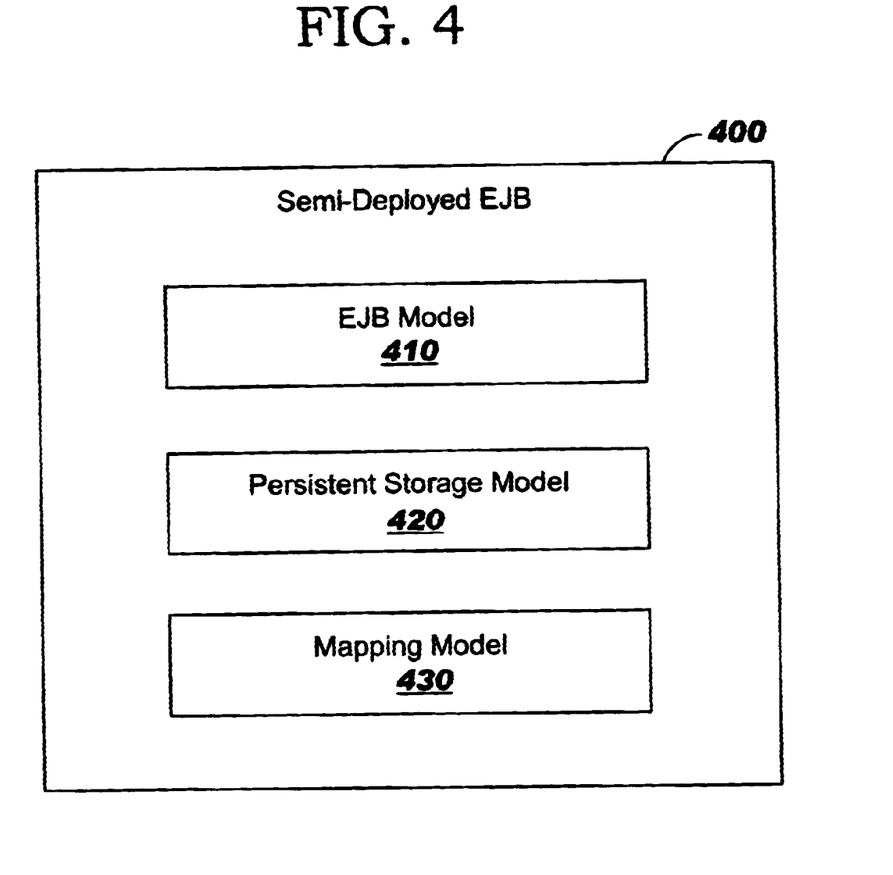
FIG. 4 is a diagram illustrating the primary models that are generated to create a semi-deployed EJB in accordance.

FIG. 4 illustrates the primary models that are generated to create a semi-deployed EJB 400 in accordance with an exemplary embodiment of the present invention. As shown in FIG. 4, the semi-deployed EJB 400 includes an EJB model 410, a persistent storage model 420, and a mapping model 430. These three models 410–430 may be created, for example, by an EJB developer using an EJB creation tool.

In a preferred embodiment, these models are persisted in an XML Metadata Interchange (XMI) form although other forms may be used without departing from the spirit and scope of the present invention. XMI is a new standard from the Object Management Group (OMG) that combines the Unified Modeling Language (UML) with the Extensible Markup Language (XML) standard. This new open industry standard combines the benefits of the web-based XML standard for defining, validating, and sharing document formats on the web with the benefits of the object-oriented Unified Modeling Language (UML), a specification of the OMG that provides application developers a common language for specifying, visualizing, constructing, and documenting distributed objects and business models. The XML Metadata Interchange Format (XMI) specifies an open information interchange model that is intended to give developers working with object technology the ability to exchange programming data over the Internet in a standardized way, thus bringing consistency and compatibility to applications created in collaborative environments.

XMI has the purpose of allowing the exchange of objects and software assets throughout application development environments from the OMG's Object Analysis and Design Facility. These objects are more commonly described as UML (Unified Modeling Language) and MOF (Meta Objects Facility). By using XMI the necessity of creating a variety of proprietary formats, each specific to a vendor tool, is avoided. In addition, XMI is intended to be a "stream"0 format. That is, it can either be stored in a traditional file system or streamed across the Internet from a database or repository.

Thus, the present invention persists the EJB model, the persistent storage model, and the mapping model in an XMI form which can be stored in a JAR file. The JAR file can be deployed by uploading the JAR file to a server, having the server's EJB tool read the model information from the JAR file and generate appropriate deployment classes based on the EJB model, persistent storage model and the mapping model.

A primary benefit of the invention is that the EJB developer has a mechanism to indicate how the deployment, e.g., the persistence, of the semi-deployed EJB is to be implemented. The deployer of the semi-deployed EJB may choose not to respect the deployment information in the semi-deployed EJB. However, the availability of the deployment information should prove beneficial in terms of helping the deployer understand what the EJB developer intended.

Another benefit of the present invention is that the deployment information does not impact the portability of the EJB. Any deployment tools that do not understand the deployment information may simply ignore it and continue their normal deployment function. Similarly, any creation tools that do not create the deployment information will simply not create it. Because the deployment information does not change the undeployed EJB, the deployment tools will then provide normal deployment function. Thus, the present invention may be implemented without causing existing deployment tools to be non-functional.

Figure 5:
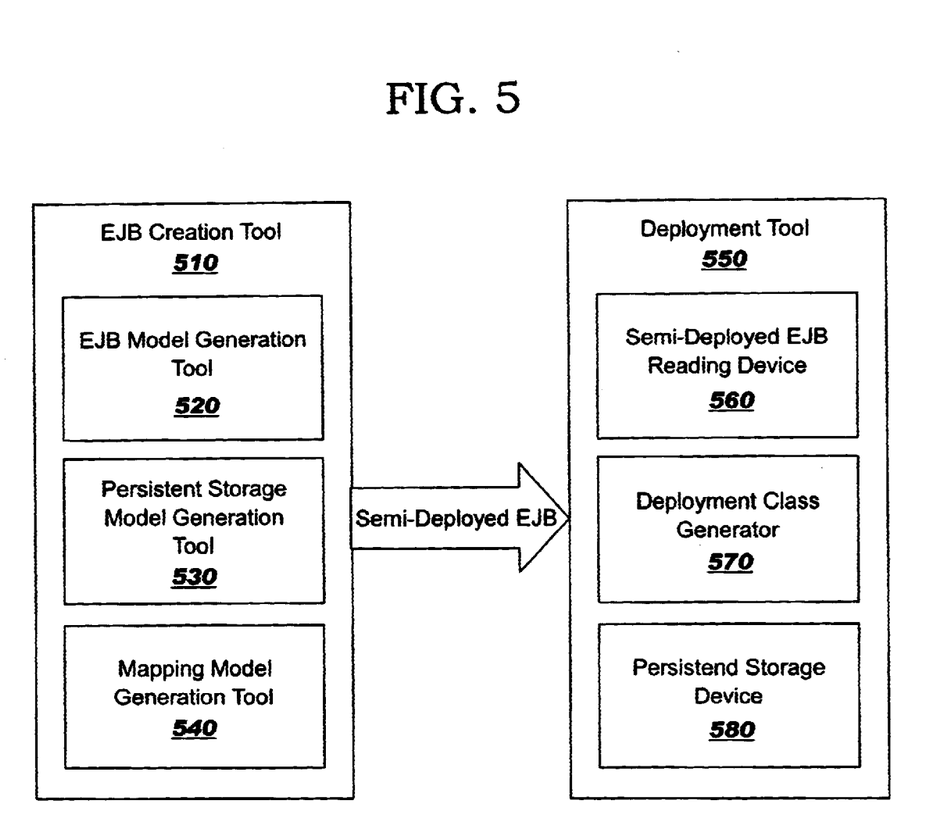
FIG. 5 is an exemplary block diagram of a system in which the present invention may be implemented.

FIG. 5 is an exemplary block diagram of a system in which the present invention may be implemented. As shown in FIG. 5, the system includes a semi-deployed EJB creation tool 510 and a deployment tool 550. The EJB creation tool 510 is comprised of an EJB model generation tool 520, a persistent storage model generation tool 530, and a mapping model generation tool 540. The deployment tool 550 is comprised of a semi-deployed EJB reading device 560, a deployment class generator 570, and a persistent storage device 580.

The tools 510–580 may be implemented in software, hardware, or a combination of software and hardware, as will be readily apparent to those of ordinary skill in the art. In a preferred embodiment, the tools 510-580 are implemented as software executing in a data processing system. In addition, the EJB creation tool 510 and the deployement tool 550 may be resident on the same data processing system or on different data processing systems in a distributed manner.

An EJB developer may make use of the EJB model generation tool 520 to generate an EJB model, the persistent storage model generator tool 530 to generate a model of the persistent storage in which the deployed EJB will persist, and the mapping model generator tool 540 to generate a mapping model for mapping the EJB model to the persistent storage model. The EJB model represents the undeployed EJB, i.e. the business logic. The persistent storage model represents the persistent storage in which the EJB will be persisted. The mapping model represents the deployment class generation information that informs the deployment tool 550 how the creator of the semi-deployed EJB intended the EJB to be deployed.

The semi-deployed EJB creation tool 510 takes each of these models and persists them in an XMI form and stores them in an undeployed JAR file. The undeployed JAR file may then be provided to the deployment tool 550 by, for example, uploading it to the data processing system on which the deployment tool 550 resides.

The semi-deployed EJB reading device 560 reads the model information from the XMI form in the JAR file and provides the model information to the deployment class generator 570. Based on the model information, the deployment class generator 570 generates Java classes for deploying the EJB and persisting the EJB in the persistent storage device 580 in a manner consistent with the mapping model. This may be done, for example, by instantiating an OMG MOF model for the EJB. The OMG MOF model can then be easily navigated, the mapping data extracted and used as input into an EJB deployment process.

Figure 6:
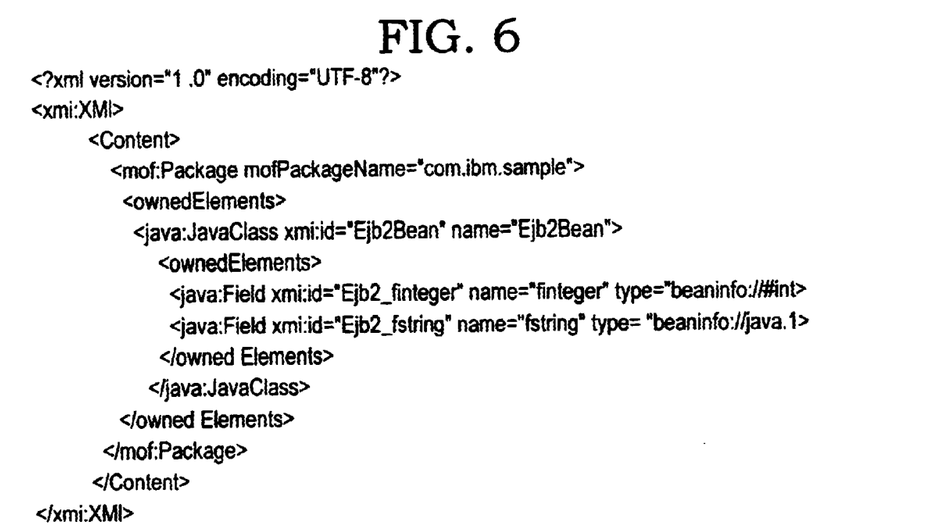
FIG. 6 is a diagram illustrating an exemplary undeployed EJB model.
Figure 7:
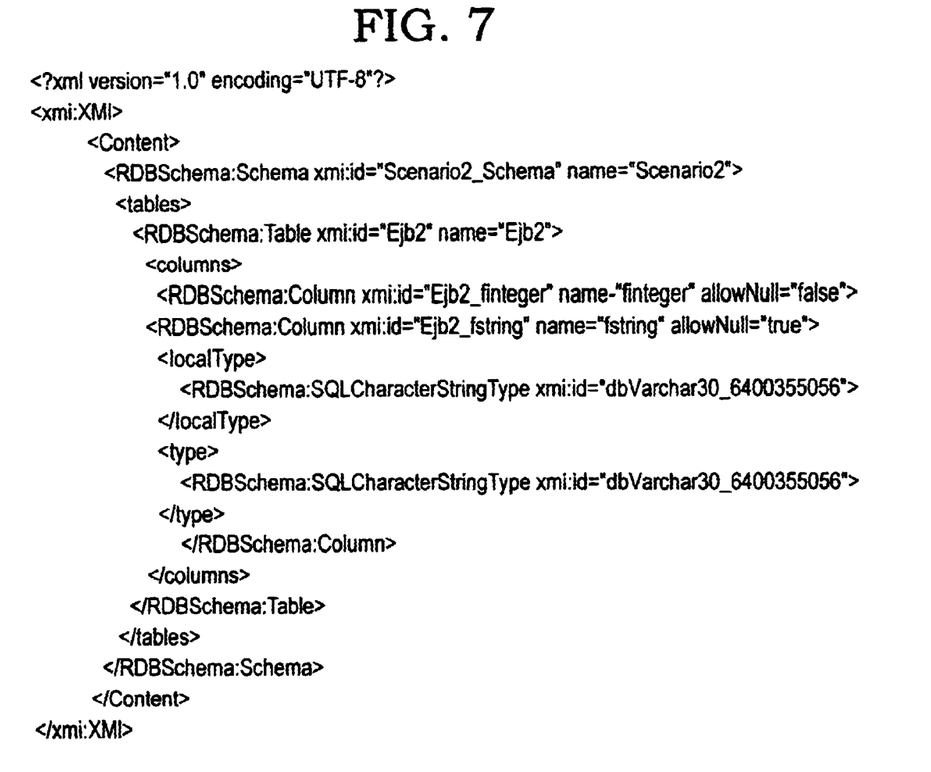
FIG. 7 is a diagram illustrating an exemplary persistent storage model.
Figure 8:
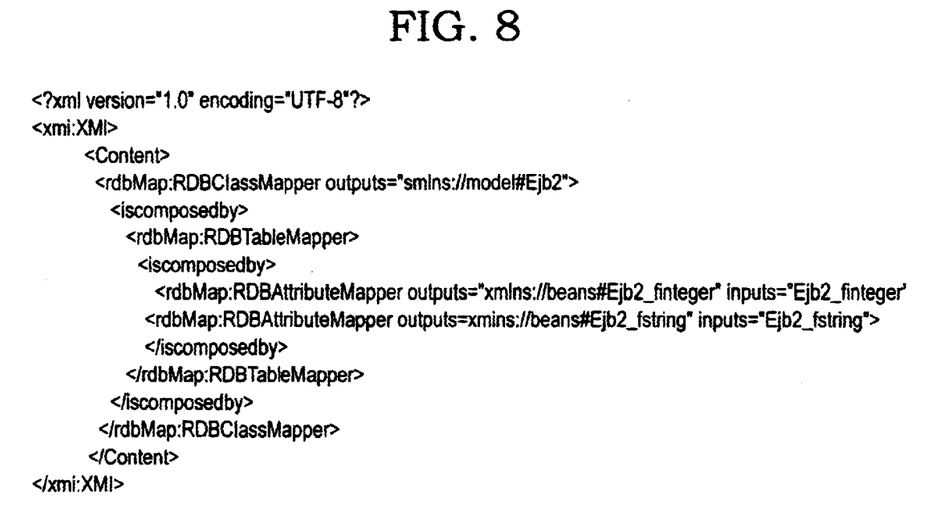
FIG. 8 is a diagram illustrating an exemplary mapping model.

FIGS. 6–8 are exemplary diagrams illustrating an exemplary undeployed EJB model, persistent storage model and mapping model, respectively. As shown in FIG. 6, the EJB model defines a simple EJB (Ejb2Bean) in package com.ibm.sample. The EJB in FIG. 6 has two fields finteger and fstring.

FIG. 7 shows a persistent storage model, also called a schema model. The persistent storage model contains a table named Ejb2 which contains two columns "finteger" and "fstring."

FIG. 8 shows a mapping model for mapping between the EJB model and the persistent storage model. As shown in FIG. 8, the mapping model contains mapping information for mapping the finteger and fstring fields in the EJB model to the finteger and fstring columns in the Ejb2 table of the persistent storage model.

Figure 9A:
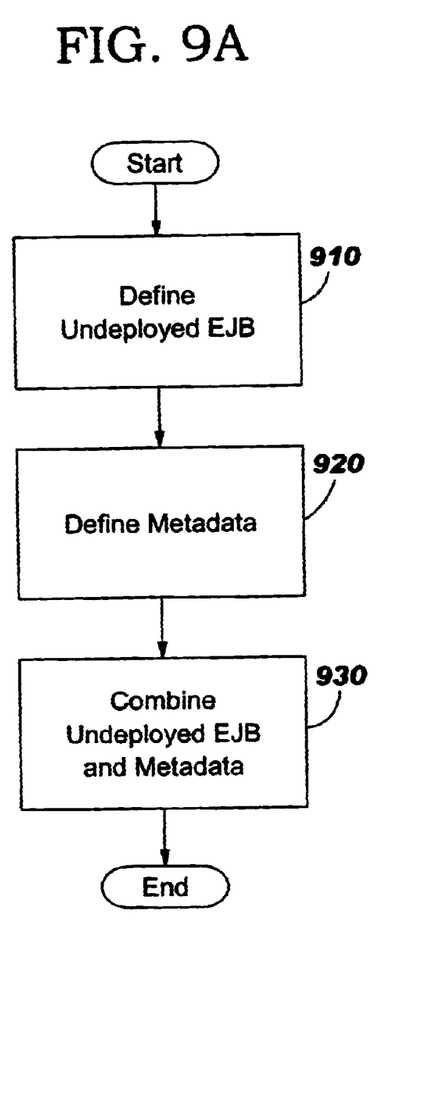
FIG. 9A is a flowchart outlining an exemplary operation of the present invention when creating a semi-deployed EJB.

FIG. 9A is a flowchart outlining an exemplary operation of the present invention when creating a semi-deployed EJB. As shown in FIG. 9A, the operation starts with defining the undeployed EJB (step 910). This may include, for example, generating an undeployed EJB model as described above.

Thereafter, the metadata identifying the deployment information is generated (step 920). This may include generating the persistent storage model and mapping model described above.

The undeployed EJB and the metadata are then combined into a JAR file (step 930). This may include persisting the undeployed EJB model, the persistent storage model, and the mapping model in an XMI form and then storing the XMI form as a JAR file. The operation then ends.

Figure 9B:
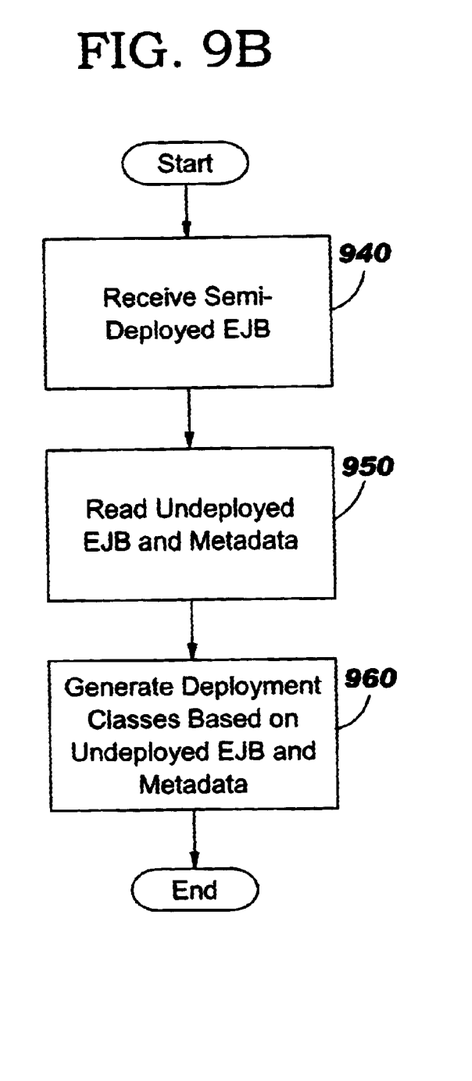
FIG. 9B is a flowchart outlining an exemplary operation of the present invention when deploying a semi-deployed EJB.

FIG. 9B is a flowchart outlining an exemplary operation of the present invention when deploying a semi-deployed EJB. As shown in FIG. 9B, the operation starts with receiving the semi-deployed EJB JAR file (step 940). The undeployed EJB and the metadata in the JAR file are read (step 950). Then, appropriate deployment classes are generated based on the undeployed EJB and the metadata (step 960). As described above, this may include generating an OMG MOF model and navigating the OMG MOF model and extracting mapping information from the OMG MOF model.

Thus, the present invention provides a mechanism by which a EJB developer may provide information to guide deployment of an undeployed EJB. In this way, a semi-deployed EJB may be generated which includes information that may be used to aid in deploying the semi-deployed EJB on particular servers. Furthermore, the present invention allows backward compatibility in that existing deployment tools may choose not to recognize or not to use the additional deployment information included in the semi-deployed EJB and deploy the EJB in a manner similar to that known in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method of generating a semi-deployed enterprise Java bean, comprising:
   defining an undeployed enterprise Java bean;
   defining metadata for the undeployed enterprise Java bean, the metadata including deployment information; and
   combining the undeployed enterprise Java bean with the metadata to generate a semi-deployed enterprise Java bean, wherein if the metadata in the semi-deployed enterprise Java bean is not recognized by a deployment tool, the deployment tool may use the undeployed enterprise Java bean to generate deployment classes.

2. The method of claim 1, further comprising persisting the semi-deployed enterprise Java bean in an XML Metadata Interchange form.

3. The method of claim 1, wherein defining an undeployed enterprise Java bean includes defining an undeployed enterprise Java bean model.

4. The method of claim 1, wherein defining metadata include defining a persistent storage model and a mapping model for the undeployed enterprise Java bean, the mapping model identifying a mapping between the undeployed enterprise Java bean and the persistent storage model.

5. The method of claim 1, further comprising persisting the semi-deployed entereprise Java bean in a Java archive file.

6. A computer program product in a computer readable medium for generating a semi-deployed enterprise Java bean, comprising:
   first instructions for defining an undeployed enterprise Java bean;
   second instructions for defining metadata for the undeployed enterprise Java bean, the metadata including deployment information; and
   third instructions for combining the undeployed enterprise Java bean with the metadata to generate a semi-deployed enterprise Java bean, wherein if the metadata in the semi-deployed enterprise Java bean is not recognized by a deployment tool, the deployment tool may use the undeployed enterprise Java bean to generate deployment classes.

7. The computer program product of claim 6, further comprising fourth instructions for persisting the semi-deployed enterprise Java bean in an XML Metadata Interchange form.

8. The computer program product of claim 6, wherein the first instructions for defining an undeployed enterprise java bean include instructions for defining an undeployed enterprise Java bean model.

9. The computer program product of claim 6, wherein the second instructions for defining metadata include instructions for defining a persistent storage model and a mapping model for the undeployed enterprise Java bean, the mapping model identifyig a mapping between the undeployed enterprise Java bean and the persistent storage model.

10. The computer program product of claim 6, further comprising fourth instructions for persisting the semi-deployed enterprise Java bean in a Java archive file.

11. An apparatus for generating a semi-deployed enterprise Java bean, comprising:
    an undeployed enterprise Java bean creation means for creating an undeployed enterprise Java bean;
    a metadata generation means for generating metadata for the undeployed enterprise Java bean, the metadata including deployment information; and
    a semi-deployed enterprise Java bean generation means for combining the undeployed enterprise Java bean with the metadata to generate a semi-deployed enterprise Java bean, wherein if the metadata in the semi-deployed enterpise Java bean is not recognized by a deployment tool, the deployment tool may use the undeployed enterprise Java bean to generate deployment classes.

12. The apparatus of claim 11, further comprising persistence means for persisting the semi-deployed enterprise Java bean in an XML Metadata Interchange form.

13. The apparatus of claim 11, wherein the undeployed enterprise Java bean creation means includes means for defining an undeployed enterprise Java bean model.

14. The apparatus of claim 11, wherein the metadata generation means includes means for define a persistent storage model and means for defining a mapping model for the undeployed enterprise Java bean, the mapping model identifying a mapping between the undeployed enterprise Java bean and the persistent storage model.

15. The apparatus of claim 11, further comprising persistence means for persisting the semi-deployed enterprise Java bean in a Java archive file.

16. A system for deploying a semi-deployed enterprise Java bean, comprising:
    an semi-deployed enterprise Java bean creation tool; and
    a deployment tool coupled to the semi-deployed enterprise Java bean creation tool, wherein the semi-deployed enterprise Java bean creation tool generates a semi-deployed enterprise Java bean including an undeployed enterprise Java bean and metadata, and wherein the deployment tool generates deployment classes for the semi-deployed enterprise Java bean based on the undeployed enterprise Java bean and the metadata, wherein if the metadata in the semi-deployed enterprise Java bean is not recognized by the deployment tool, the deployment tool may use the undeployed enterprise Java bean to generate the deployment classes.

17. The system of claim 16, wherein the semi-deployed enterprise Java bean is provided to the deployment tool in an XML Metadata Interchange form.

18. The system of claim 16, wherein the undeployed enterprise Java bean is defined by the semi-deployed enterprise Java bean creation tool using an undeployed enterprise Java bean model.

19. The system of claim 16, wherein the metadata is defined by the semi-deployed enterprise Java bean creation tool by defining a persistent storage model and a mapping model for the undeployed enterprise Java bean, the mapping model identifying a mapping between the undeployed enterprise Java bean and the persistent storage model.

20. The system of claim 16, wherein the semi-deployed enterprise Java bean is provided to the deployment tool as a Java archive file.

21. The system of claim 16, wherein the semi-deployed enterprise Java bean creation tool and the deployment tool reside on the same computing device.

22. The system of claim 16, wherein the semi-deployed enterprise Java bean creation tool and the deployment tool reside on different computing devices.

* * * * *

UNITED STATES PATENT AND TRADEMARK OFFICE
CERTIFICATE OF CORRECTION

PATENT NO. : 6,665,861 B1
DATED : December 16, 2003
INVENTOR(S) : Francis et al.

It is certified that error appears in the above-identified patent and that said Letters Patent is hereby corrected as shown below:

Column 3,
Line 20, delete "return".

Column 10,
Line 52, after "for", delete "define" and insert -- defining --.

Signed and Sealed this

Thirteenth Day of April, 2004

JON W. DUDAS
*Acting Director of the United States Patent and Trademark Office*